US007191195B2

(12) United States Patent
Koyama et al.

(10) Patent No.: US 7,191,195 B2
(45) Date of Patent: Mar. 13, 2007

(54) DISTRIBUTED FILE SHARING SYSTEM AND A FILE ACCESS CONTROL METHOD OF EFFICIENTLY SEARCHING FOR ACCESS RIGHTS

(75) Inventors: Noritaka Koyama, Tokyo (JP); Kumiko Wada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 390 days.

(21) Appl. No.: 10/305,139

(22) Filed: Nov. 27, 2002

(65) Prior Publication Data
US 2003/0101200 A1 May 29, 2003

(30) Foreign Application Priority Data
Nov. 28, 2001 (JP) ............................. 2001-362287

(51) Int. Cl.
G06F 17/30 (2006.01)
(52) U.S. Cl. ...................... 707/201; 709/207; 709/229; 707/3; 707/10
(58) Field of Classification Search .................. 707/10, 707/3, 200–206; 709/207, 229
See application file for complete search history.

(56) References Cited

U.S. PATENT DOCUMENTS 5,956,718 A * 9/1999 Prasad et al. ................. 707/10
6,088,725 A * 7/2000 Kondo et al. ................ 709/220
6,247,026 B1 * 6/2001 Waldo et al. ................ 707/206
6,260,040 B1 * 7/2001 Kauffman et al. ............. 707/10
6,658,417 B1 * 12/2003 Stakutis et al. ............... 707/10
2002/0188735 A1 * 12/2002 Needham et al. ........... 709/229
2003/0055818 A1 * 3/2003 Faybishenko et al. ......... 707/3
2004/0249902 A1 * 12/2004 Tadayon et al. ............. 709/207
2004/0255048 A1 * 12/2004 Lev Ran et al. ............ 709/249

FOREIGN PATENT DOCUMENTS

| JP | 6332782 | 12/1994 |
|---|---|---|
| JP | 8077054 | 3/1996 |
| JP | 9305470 | 11/1997 |
| JP | 11120063 | 4/1999 |

* cited by examiner

Primary Examiner—Sathyanarayan Pannala
(74) Attorney, Agent, or Firm—Venable LLP; Michael A. Sartori; Catherine M. Voorhees

(57) ABSTRACT

With a shared index information file in a file sharing index manager, a distributed file system controls access to files based on access right obtained from the index information. Even when a host terminal operated by a user does not have directory information required, that host terminal may obtain an access right from the file sharing index manager without making access to the host terminals. The host terminals perform local management via file sharing managers to minimize accesses to the host terminals which are required until processing is completed.

16 Claims, 16 Drawing Sheets

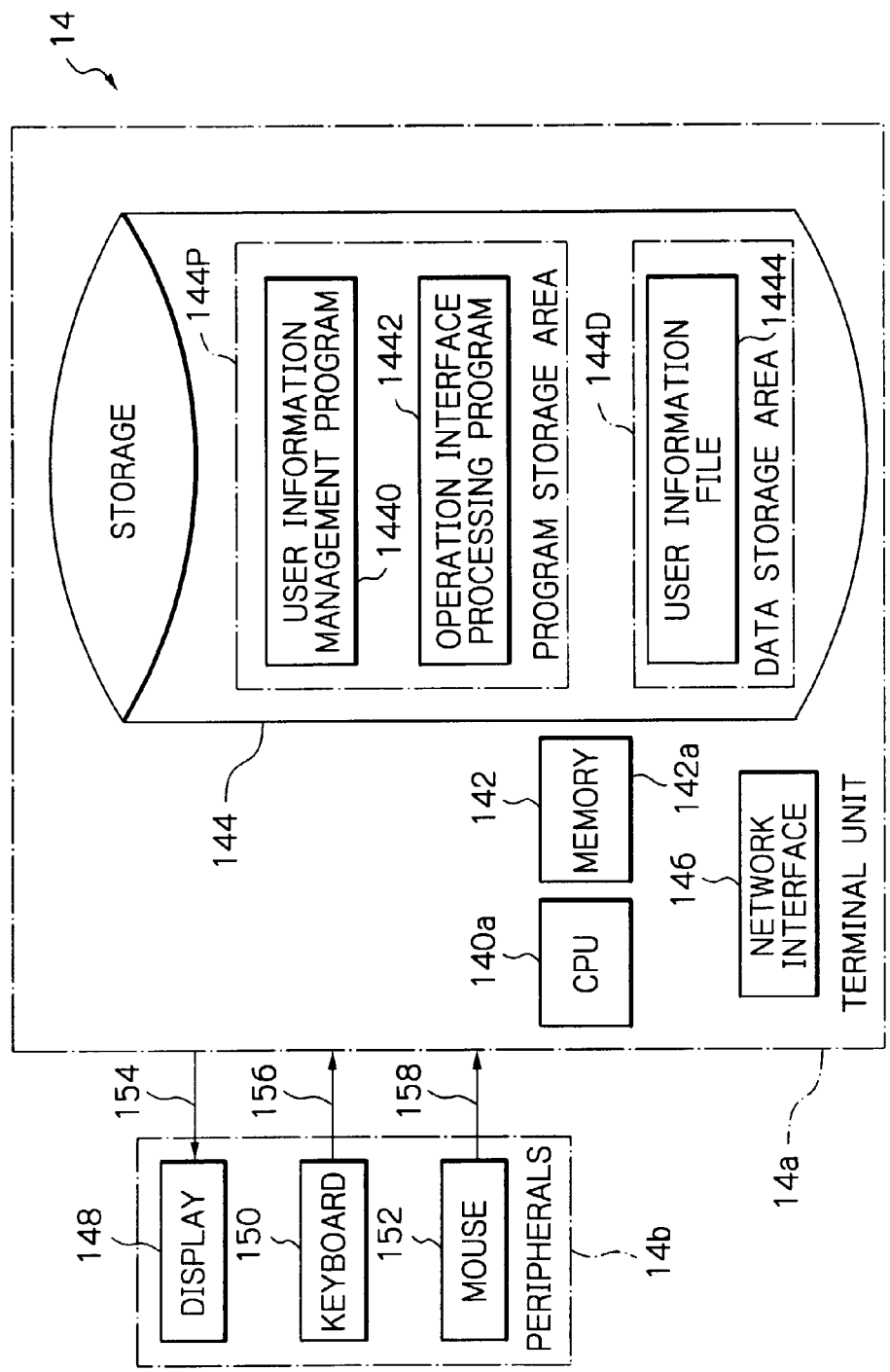

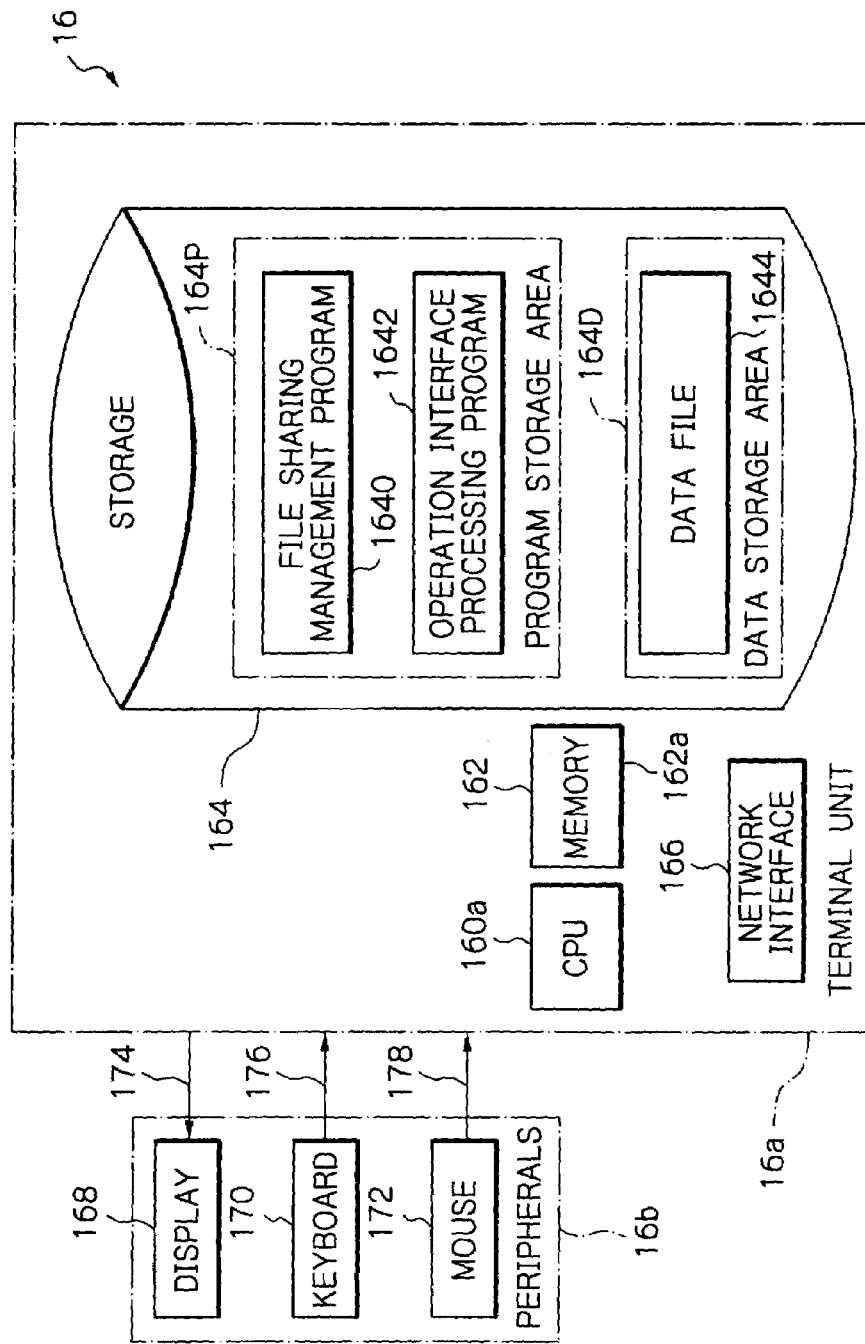

*Fig. 5A*
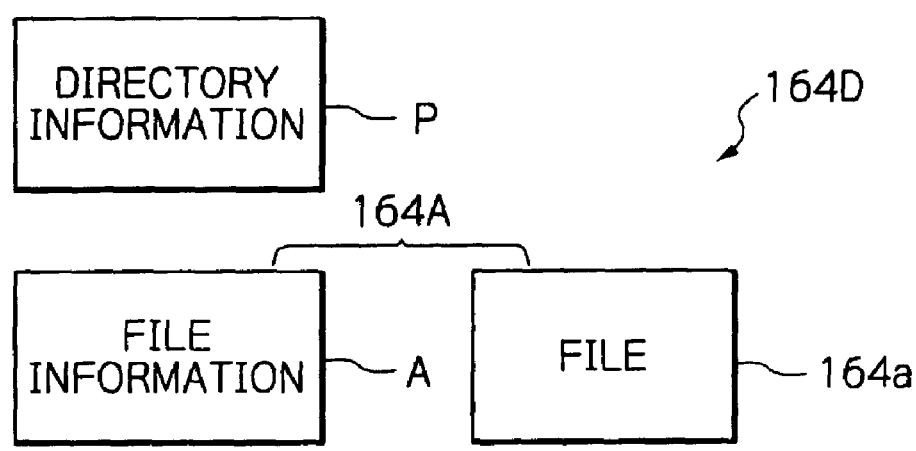
LOCAL VIEW  *Fig. 5B*
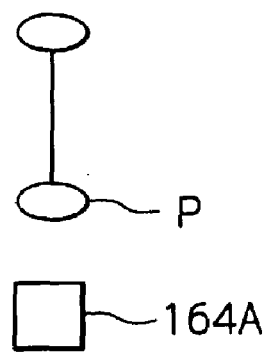

LOCAL VIEW

GLOBAL VIEW

Fig. 8

| KEY | VALUE |
|---|---|
| DIRECTORY NAME | VIRTUAL DIRECTORY PATH NAME IN THE SYSTEM |
| DIRECTORY UPDATE DATE | DATE ON WHICH DIRECTORY WAS UPDATE LAST |
| OWNER | OWNER'S NAME |
| TERMINATION DATE | SEARCH CANNOT BE MADE AFTER THIS DATE. |
| PUBLICATION DATE | SEARCH CANNOT BE MADE BEFORE THIS DATE. |
| ACCESS RIGHT | ACCESS CONTROL LIST |

Fig. 10

| KEY | VALUE |
|---|---|
| FILE NAME | VIRTUAL FILE PATH NAME IN THE SYSTEM |
| FILE UPDATE DATE | DATE ON WHICH FILE WAS UPDATE LAST |
| OWNER | OWNER'S NAME |
| TERMINATION DATE | SEARCH CANNOT BE MADE AFTER THIS DATE. |
| PUBLICATION DATE | SEARCH CANNOT BE MADE BEFORE THIS DATE. |
| FILE STATUS | ORIGINAL FILE OR CACHE FILE |

Fig. 11A
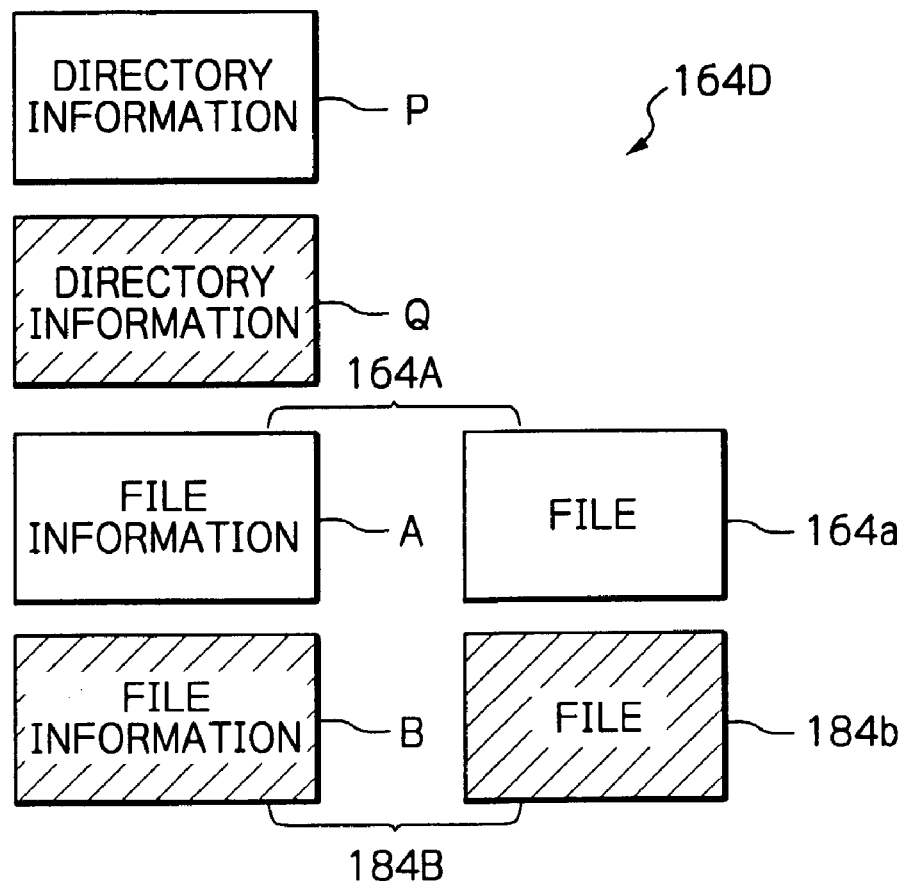
Fig. 11B
LOCAL VIEW
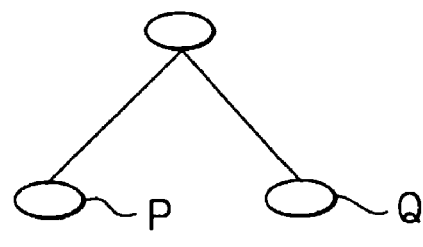
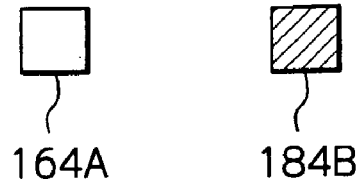

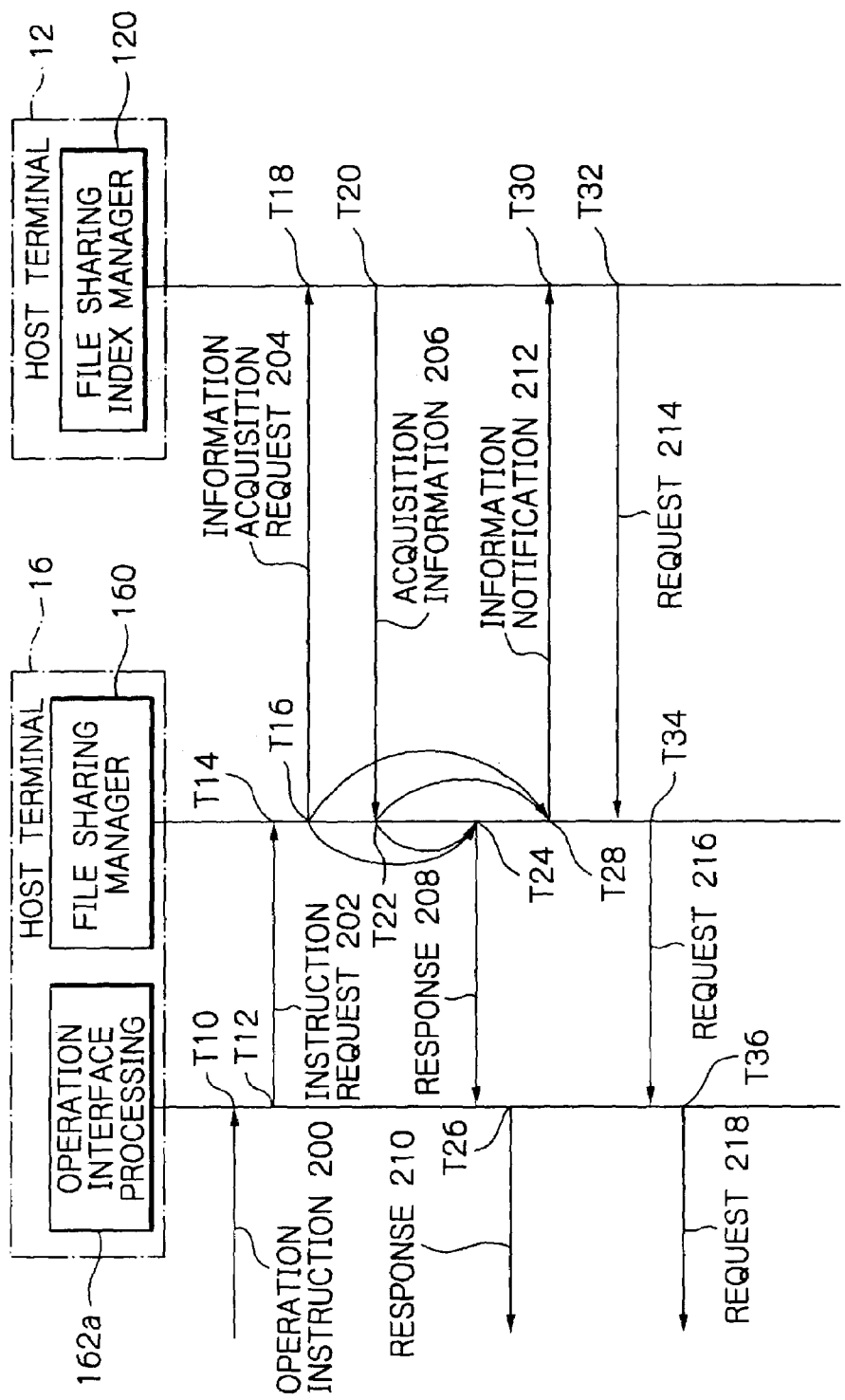

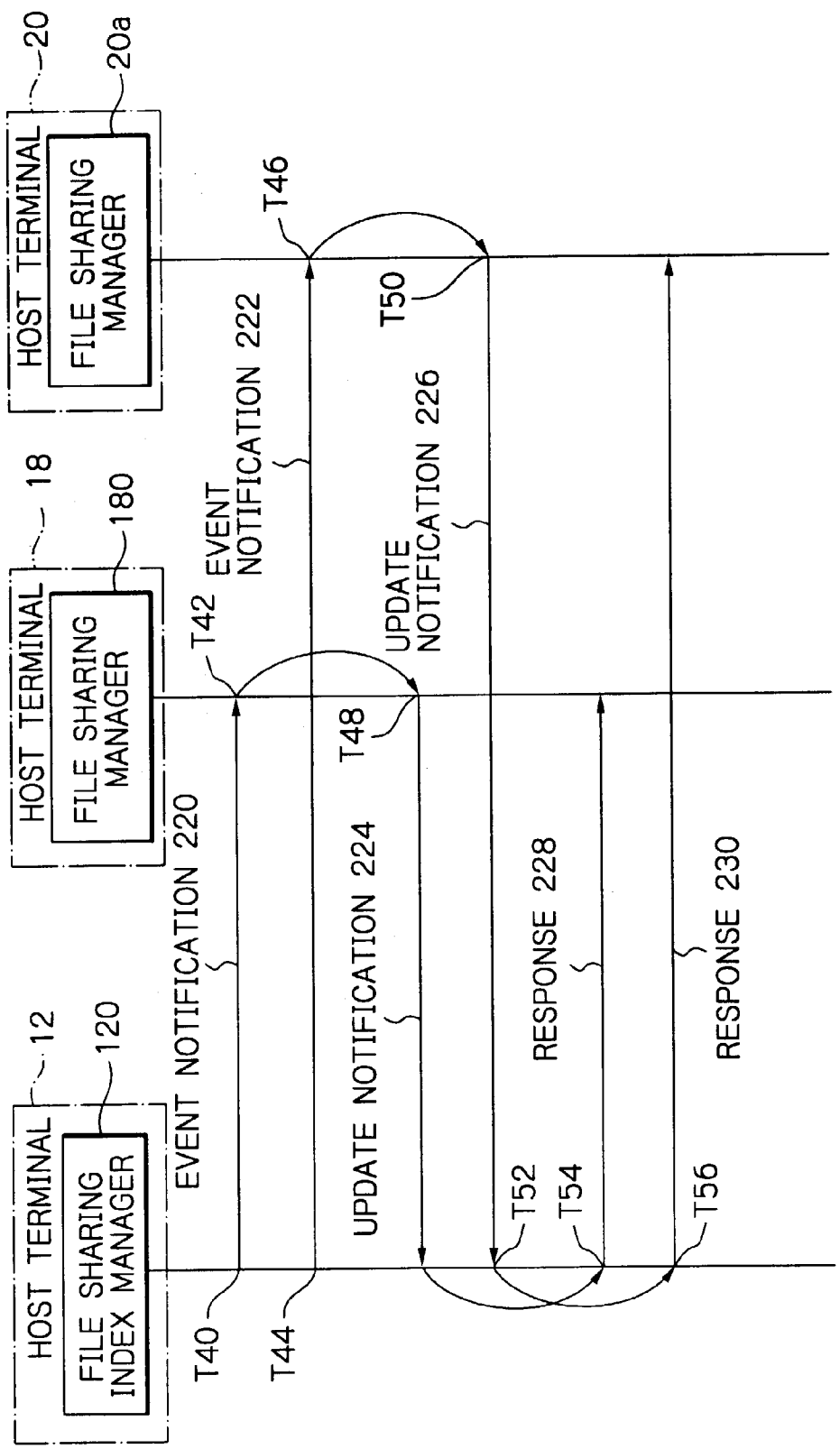

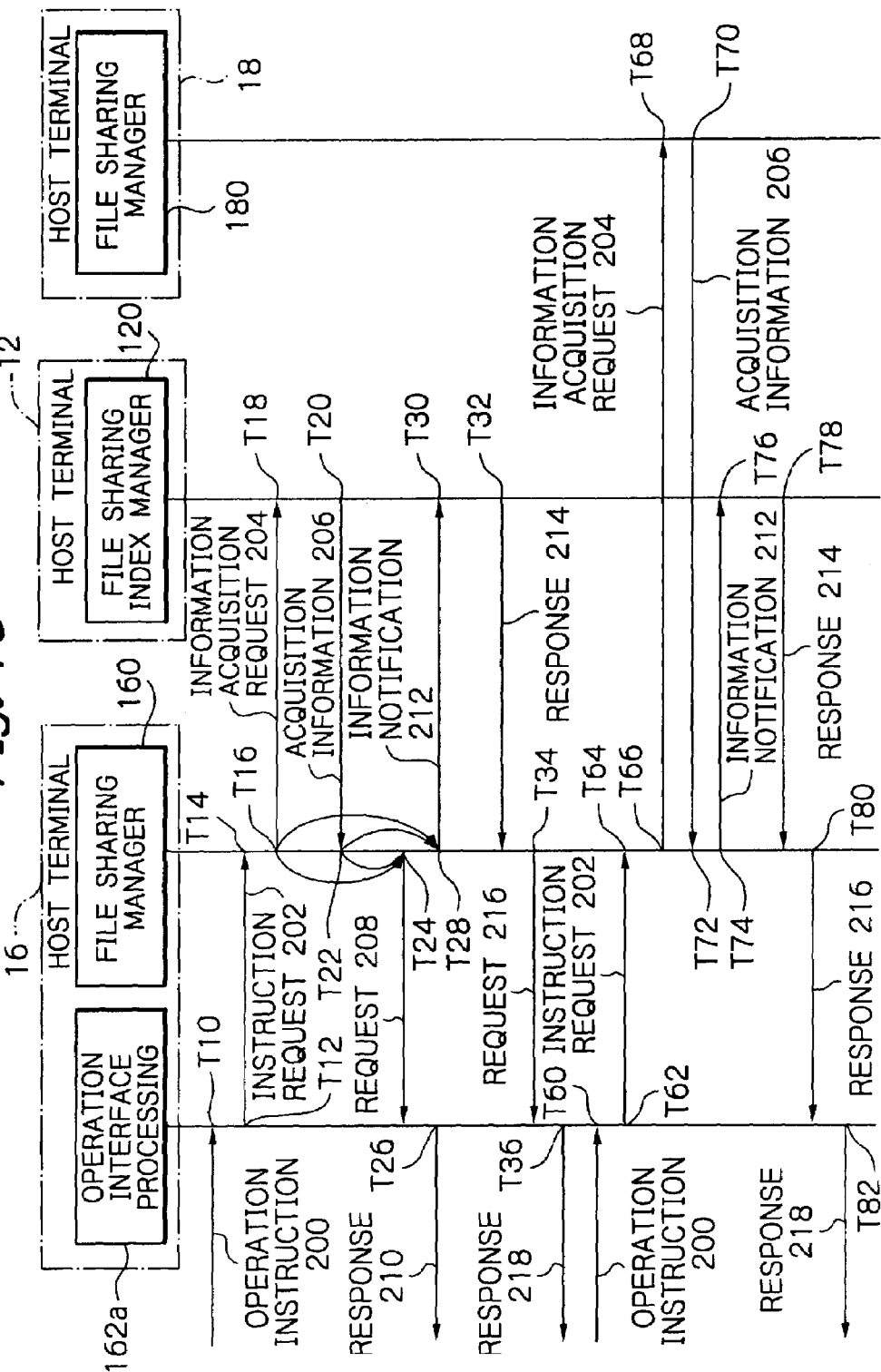

DISTRIBUTED FILE SHARING SYSTEM AND A FILE ACCESS CONTROL METHOD OF EFFICIENTLY SEARCHING FOR ACCESS RIGHTS

BACKGROUND OF THE INVENTION

1. Field of the Invention

The present invention generally relates to a distributed file sharing system. More particularly, the present invention relates to a distributed file sharing system advantageously applicable to a distributed file system that has a plurality of terminals distributed on, and connected to, a network and that allows the terminals to share files to build a single virtual file system. In addition, the invention also relates to a file access control method of dealing with such a distributed file system as a virtual file system, advantageously applicable to the access control of the directories or files in the file system

2. Description of the Background Art

On a computer terminal used as a host terminal, an access control list provided as one of OS (Operating System) functions is usually used for the file access control method. In the UNIX (trademark) system that is one of the operating systems, there are three classes of users for every file and directory: owner, owner group, and other users. For each of those classes, three types of access permission, read, write and execute, are assigned for controlling access to files. When a remote terminal uses the host terminal over a network, the host terminal examines an account of the user stored therein to check if the remote terminal has access permission for the files or directories.

From the standpoint of access control, a method is proposed for balancing or reducing the load that would otherwise be increased when a plurality of host terminals share a file server. Japanese patent Laid-Open Publication No. 120063/1999 discloses a shared file system in a distributed system eliminating the load of file management calculation and preventing file data from being transferred via a network to increase processing speed.

Japanese Patent Laid-Open Publication No. 305470/1997 discloses a shared file management device which monitors the status of shared files and the file storing means. Based on the monitoring result, the system manager reviews the arrangement or multiplexing of shared files and, based on the review, the file access control moves or multiplexes shared files to increase operation efficiency. Japanese Patent Laid-Open Publication No. 77054/1996 discloses a distributed file system in which each of server computers on a computer cluster, where a plurality of computers are networked, has the divided-file creation and deletion parts to create and delete a plurality of divided-files corresponding to distributed files, respectively. The distributed file management part sends out divided-file reference/update distribution information to a client computer before making a reference/update request to a distributed file. In response to this information, the reference/update request distribution part determines the location of the divided-file, in which a record index is stored for specifying the reference/update request, to efficiently distribute the load even when processing requests are received at a time.

In addition, Japanese Patent Laid-Open Publication No. 332782/1994 teaches a file server system, in which a plurality of file servers are provided on a network and each file server accesses its own file storage device. In this system, the file access request distributor references the load status of each file server, measured by the load information monitor, to select a file server to be accessed, in order to control file management. The file access request distributor issues a file access request under the corresponding communication control according to whether the selected file server is its own server or one of other servers. In particular, the file access request distributor selects a lightly loaded file server at write time to prevent access requests from concentrating on a particular file server. The four proposals described above are made from the standpoint of access control. They are essentially different from a technology that grants access rights to control file access.

A distributed file sharing system will be discussed below in which a plurality of host terminals are distributed on a network to form a single virtual file system. In general, a large problem with such a distributed file system is how access right should be integrated in the system. More specifically, in such a distributed file system, one host terminal controls the operation of the access right management server. In this case, the application of the file access method used in the UNIX system described above, in which the access right is checked of all directories and files included in a file path, would cause the distributed file system to check both the directories and the files during file access right checking. This requires an extremely long search period of time and sometimes becomes unrealistic.

A file search in a distributed file sharing system, where the concept of file sharing is introduced, requires the system to check the application-level access right of the directories and files of all file paths satisfying the search condition. It is therefore estimated that the distributed file sharing system will require a still longer search period of time.

A distributed file sharing system, which is treated virtually as a single file system as described above, makes it possible for a copy of a file in one host terminal to be cached into another host terminal. Because of this cache function, the access right checking of a host terminal file, once accessed and obtained, need not be made via the network unless the file is deleted. Regardless of this function, the host terminal issues an inquiry to the access right management server via the network when checking the access right of the file already stored in the terminal. This nullifies the significance of file caching in the host terminal.

SUMMARY OF THE INVENTION

It is an object of the present invention to provide a distributed file sharing system and a file access control method with a reduced search period of time for checking access rights and increased file operation efficiency.

In accordance with the present invention, a distributed file sharing system comprises terminals acting as host terminals connected to a network and managing files, each of which contains a collection of data, stored below directories each indicating a position in a hierarchical structure, wherein at least one of the host terminals acts in the network as a global management functional block managing all index information, the index information including access right information representative of right to access directories and files relating to sharing, each of the host terminals including a file sharing management functional block managing the files and the directories shared by the host terminals, as well as the files locally for each host terminal, the file sharing management functional block setting and managing the access right information on directories used in managing the files.

The distributed file sharing system in accordance with the present invention stores the index information on shared files in the global management functional block to manage access right based on the index information. Therefore, even when there is no required directory information on a host terminal on which the user is operating, the system allows the host terminal to easily obtain access right from the global management functional block without making access to the host terminals and to perform local management via the file sharing management functional block.

Further in accordance with the invention, a method of controlling access to files in a distributed file sharing system comprises the steps of: preparing host terminals connected to a network and managing files, each of which contains a collection of data, stored below directories each indicating a position in a hierarchical structure; receiving by one of the host terminals an operation request for information on either one of the directory and the file; issuing an access request to a target to be managed in response to the operation request from the one host terminal; checking, in response to the access request, whether or not a user has an access right to access the target right to issue the access request based on collectively managed access rights; processing the information associated with the access request when the user has the access right; issuing a response, when the user does not have the access right, indicating that the processing requested by the access request will not be performed; processing index information including the access right for each of the host terminals as the target to be managed; and providing the host terminal operated with a response signal associated with the index information processed.

Before a directory or a file is operated, the file access control method in accordance with the present invention checks access right that has been set up and checks whether or not access to an operation target is permitted. As compared with the file search operation executed at individual application level, the method according to the invention requires less search period of time.

BRIEF DESCRIPTION OF THE DRAWINGS

The objects and features of the present invention will become more apparent from consideration of the following detailed description taken in conjunction with the accompanying drawings in which:

FIG. 3 is also a schematic block diagram showing the general configuration of a host terminal, included in the host terminals shown in FIG. 1, that performs user information management;

FIG. 4 is a schematic block diagram, like FIG. 2, showing the general configuration of a general host terminal, included in the host terminals shown in FIG. 1, that performs file sharing management;

FIGS. 5A and 5B schematically show file management in a host terminal shown in FIG. 1;

FIG. 8 shows the data items included in the directory information of a directory in a host terminal shown in FIG. 1;

FIG. 10 shows the data items included in the file information of a file in a host terminal shown in FIG. 1;

FIGS. 11A and 11B schematically show file management after a file has been acquired in the host terminal shown in FIG. 5;

FIG. 14 is a sequence diagram schematically showing the basic operation on a directory and a file in the distributed file system shown in FIG. 1;

FIG. 15 is also a sequence diagram schematically showing the basic operation when an event notification is issued in the distributed file system shown in FIG. 1; and FIG. 16 is a sequence diagram schematically showing the file search and acquisition operations in the distributed file system shown in FIG. 1.

DESCRIPTION OF THE PREFERRED EMBODIMENT

Figure 1:
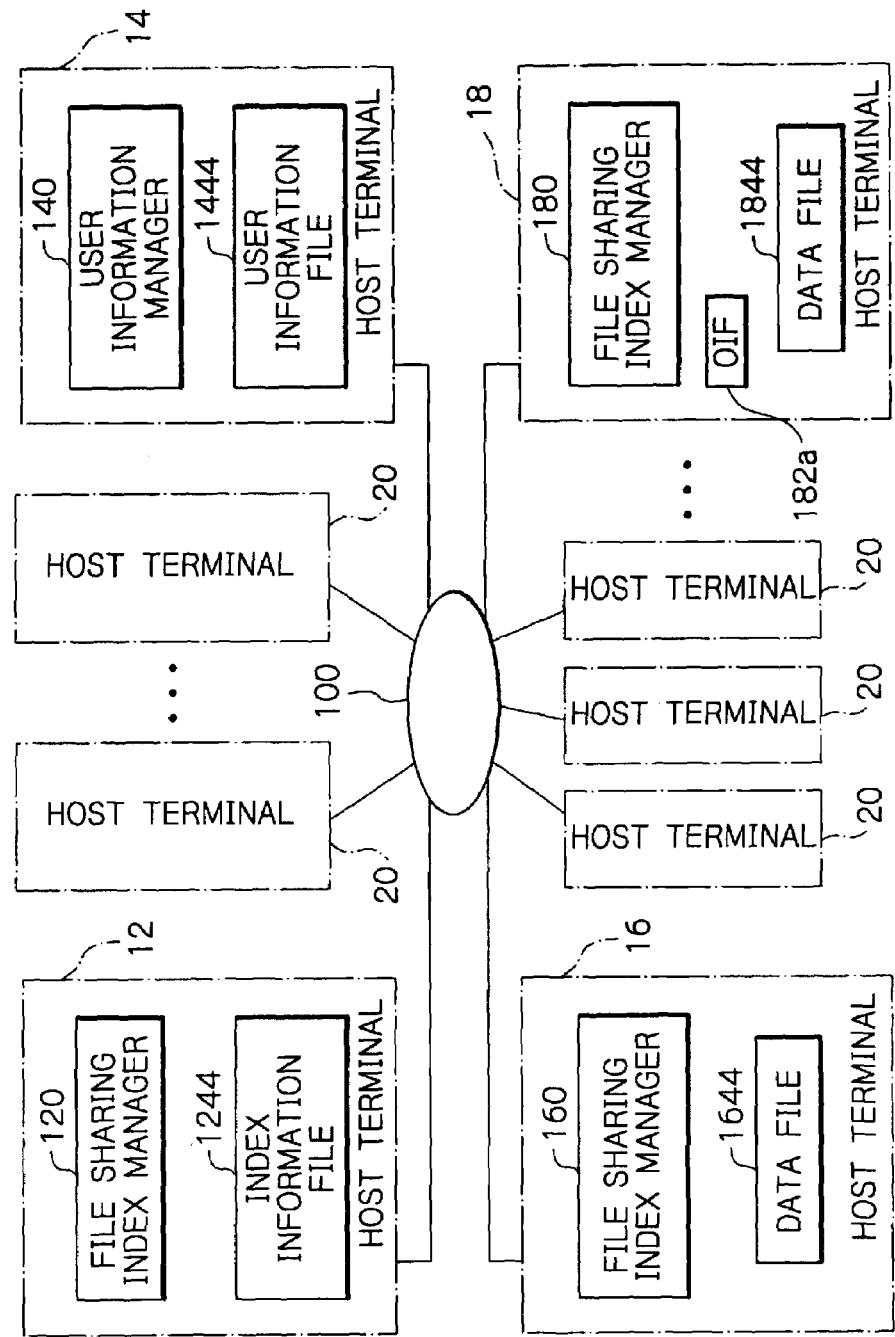
FIG. 1 is a schematic block diagram showing the general configuration of a distributed file system to which applied is a distributed file sharing system according to the present invention.

With reference to the accompanying drawings, a preferred embodiment of a distributed file sharing system according to the present invention will be described in detail. In this embodiment, the distributed file sharing system according to the present invention is applied to a distributed file system 10 that works as a virtual file system. From the drawings and description, the parts are omitted which are not related directly to the understanding of the present invention. In the description below, signals are referenced with reference numerals allotted on connections over which the signals are transferred.

In the distributed file system 10, a plurality of host terminals 12, 14, 16, 18, 20 and so on are connected to a network 100 as shown in FIG. 1. The host terminal 12 comprises a file sharing index management functional unit or manager 120 and an index information file 1244. The host terminal 14 comprises a user information management functional unit or manager 140 and a user information file 1444. The host terminals 16 and 18 comprise a pair of a file sharing management functional unit or manager 160 or 180 and a data file 1644 or 1844, respectively. The host terminals 20 depicted with dot-and-dashed lines are also one of three types of host terminal.

Figure 2:
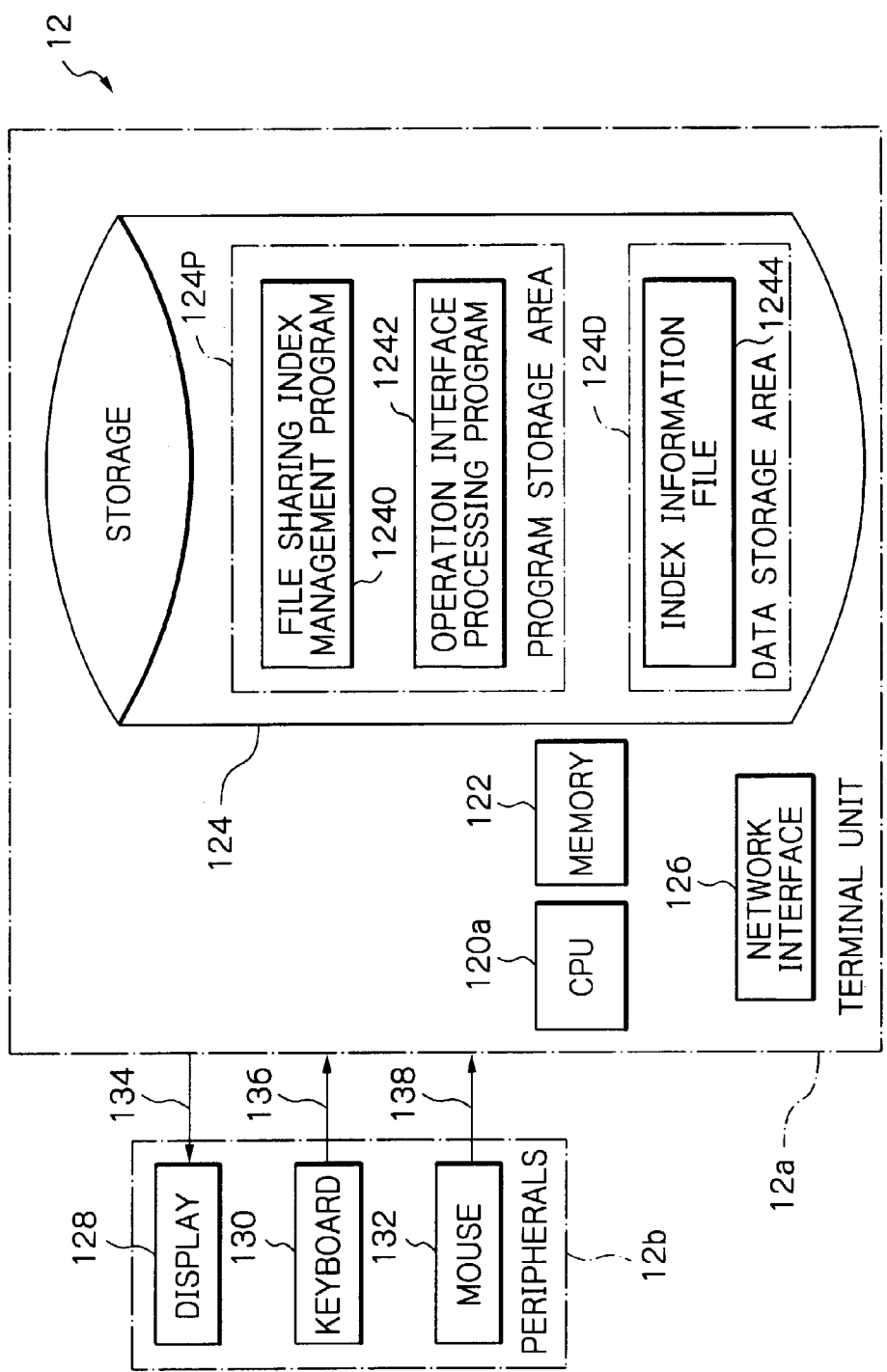
FIG. 2 is a diagram showing the general configuration of a host terminal, which is included in the host terminals shown in FIG. 1, that performs file sharing index management.

The following describes the configuration of each host terminal. The host terminal, 12, 14, 16, 18, and so on, comprises a terminal unit, 12a, 14a, 16a, 18a, and so on, and a peripheral unit, 12b, 14b, 16b, 18b, and so on, respectively. As shown in FIG. 2, the terminal unit 12a of the host terminal 12 comprises a CPU (Central Processing Unit) 120a, memory 122, storage 124, and network interface 126. The peripheral unit 12b comprises a display 128, a keyboard 130, and a mouse 132 used as a pointing device. The peripheral unit 12b is connected to the terminal unit 12a via signal lines 134, 136 and 138.

The storage 124 comprises a hard disk drive unit (HDD). The storage 124 includes two storage areas: program storage area 124P corresponding to the file sharing index management functional unit 120 and data storage area 124D. The program storage area 124P contains a file sharing index management program 1240 and an operation interface processing program 1242. The file sharing index management program 1240 manages the index information file 1244 provided for all files and directories shared by the host terminals 12, 14, 16, 18, and so on connected to the network 100. The data storage area 124D contains the index information file 1244 containing index information on all shared files and directories.

The network interface 126 functions as a connection interface with the network 100. The host terminal 12 is connected to the network 100 via the network interface 126. The distributed file system 10, which also includes other host terminals 14, 16, 18, and so on, builds a single virtual file system.

As shown in FIG. 3, the terminal unit 14a of the host terminal 14 comprises a CPU 140a, a memory 142, a storage 144, and a network interface 146. The peripheral unit 14b comprises a display 148, a keyboard 150, and a mouse 152. The peripheral unit 14b is connected to the terminal unit 14a via signal lines 154, 156, and 158.

The storage 144 comprises also an HDD that includes two storage areas: program storage area 144P corresponding to the user information management functional unit 140 and data storage area 144D. The program storage area 144P contains a user information management program 1440 and an operation interface processing program 1442. The user information management program 1440 manages the user information file 1444 containing information on the host terminals 12, 14, 16, 18, and so on connected to the network 100. The user information file 1444 contains, for example, user IDs (Identifier) identifying users and security information such as passwords. The data storage area 144D contains the user information file 1444.

The user information management functional unit 140 can group the user information in the user information file 1444 based on definition information. Because the definition information may be set out in various ways, the user may belong to a plurality of groups. When the user uses the operation interface, the user information management functional unit 140 authenticates the user. More specifically, when the user enters the user ID and security information through the keyboard at login time into the host terminal, the entered information is compared with the user information in the user information file 1444 to authenticate the user.

More specifically, the user information refers to a user ID, security information, and the like. The user information management functional unit 140 checks the result of this authentication and permits only an authorized user to perform operation. At this time, the operation interface processing program of the corresponding host terminal is loaded into the memory 142 and acts as an operation interface processing functional unit 142a to accept operations.

The network interface 146 functions as a connection interface with the network 100. For the host terminals 12, 16, 18, and so on that have neither the user information management functional unit 140 nor the user information file 1444, the host terminal 14 receives a user ID and security information from the host terminals 12, 16, 18 and so on via the network interface 146 and returns the authentication result to those terminals. Whether the user may access the system depends on the returned result.

The host terminal 14 may include the file sharing management functional unit not shown. This functional unit will be described later.

As shown in FIG. 4, the terminal unit 16a of the host terminal 16 comprises a CPU 160a, a memory 162, a storage 164, and a network interface 166. The peripheral unit 16b comprises a display 168, a keyboard 170, and a mouse 172. The peripheral unit 16b is connected to the terminal unit 16a via signal lines 174, 176, and 178.

The storage 164 comprises an HDD that includes two storage areas: program storage area 164P corresponding to the file sharing management functional unit 160 and data storage area 164D. The program storage area 164P contains a file sharing management program 1640 and an operation interface processing program 1642. The file sharing management program 1640 manages files according to the processing to be executed for the data files 1644 and 1844 that are specified as shared by the host terminals 16, 18, and so on connected to the network 100. The data file 1644 in the data storage area 164D contains, for example, directory information and file information.

The file sharing management functional unit 160 allows the user to locally execute the file or directory operation function. At the same time, the file sharing management functional unit 160 works with the file sharing index management functional unit 120, user information management functional unit 140, and file sharing management functional unit 180 in the other host terminals 12, 14, 18, and so on. As will be described later, the file or directory operation function includes the storing function, search function, acquisition function, read function, update function, and delete function.

In the distributed file system 10, the host terminals 18 and so on are distributed, which have the configuration similar to that of the host terminal 16. The host terminal 18 has the file sharing management functional unit 180.

Next, information stored in the data storage areas 164D, 184D, and 124D used in the distributed file system 10 will be described. The host terminal 16 has the data file 1644 in the data storage area 164D. As shown in FIG. 5A, the data file 1644 contains directory information P on the directory "/P" and a file 164A (="P/A"). The file 164A is one file that contains both file information A and a file 164a. The directory "/P" and the file 164A are manipulated through an operation interface processing functional unit 162a implemented by loading the operation interface program into the memory 162 and are created and stored by the file sharing management functional unit 160.

Note that the file 164a is not a file whose path is represented by "/P/A" in the OS used on the host terminal 16. The operation interface processing functional unit 162a, when used to display the files managed by the file sharing management functional unit 160, displays the directory "/P" and the file 164A in the tree structure format as shown in the local view in FIG. 5B.

Figure 6A:
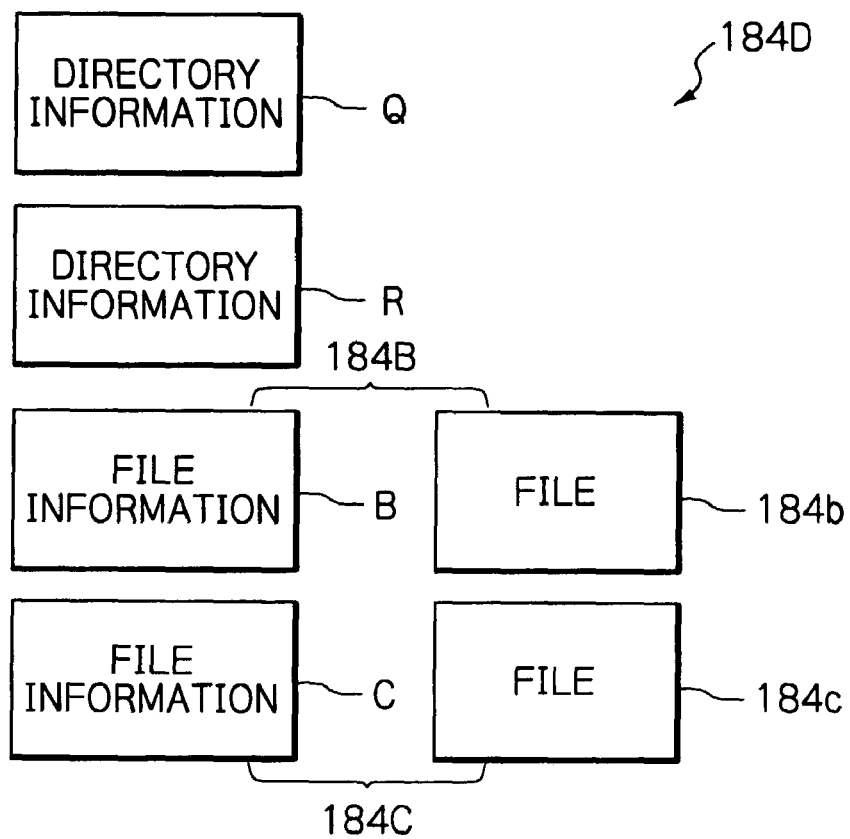
FIGS. 6A and 6B schematically show file management in another host terminal shown in FIG. 1.
Figure 6B:
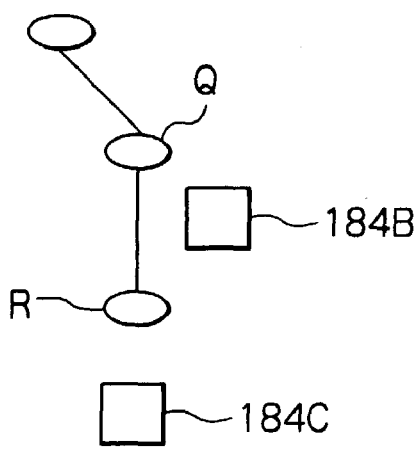

Similarly, the host terminal 18, which includes the file sharing management functional unit 180, has directory information Q and R in the data storage area in FIG. 6A. A file 184B relates file information B with file 184b, and a file 184C relates file information C with a file 184c, respectively. More specifically, the files are managed using the relations represented by the directories "/Q" and "/Q/R" and files "/Q/184B" and "Q/R/184C". The directories and files described above are manipulated through an operation interface processing functional unit 182a and are created and stored by the file sharing management functional unit 180. Note that the files 184b and 184c are not files whose paths are represented by "/Q/184B" and "/Q/R/184C" in the OS used on the host terminal 18. The operation interface processing functional unit 182a, when used to display the files managed by the file sharing management functional unit 180, displays the directory "/Q" and the file 184B belonging to that directory, and the directory "/Q/R" and the file 184C belonging to that directory, in the tree structure format as shown in the local view in FIG. 6B.

Figure 7A:
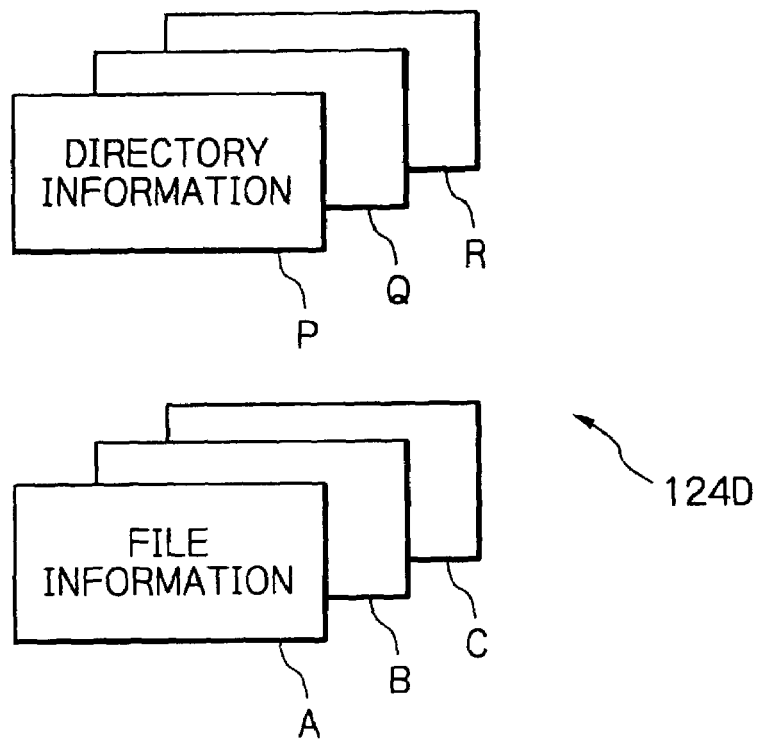
FIGS. 7A and 7B schematically show file management and index information management in still another host terminal shown in FIG. 1.
Figure 7B:
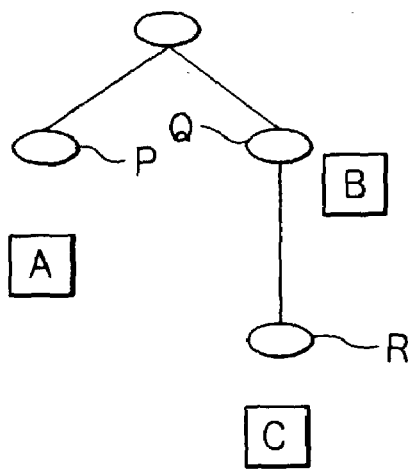

As shown in FIG. 7A, the host terminal 12 uses the file sharing index management functional unit 120 to integrally manage all directory information P, Q, and R and file information A, B, and C used in the distributed file system 10. This directory and file information, called index information, is stored in the index information file 1244. When the index information file 1244 is displayed as a global view under management of the file sharing index management functional unit 120, the index information file 1244 containing directory information and file information is displayed as a virtual tree structure. As shown in FIG. 7B, this tree structure indicates the relation between a directory and file information as follows: directory "/P"—file information A, directory "/Q"—file information B, and directory "/Q/R"—file information C.

The following describes the directory information and the file information described above. As shown in FIG. 8, the directory information is composed of a key 40, directory name 42, directory update date 44, owner 46, termination date 48, publication date 50, and access right 52. The key 40 is a value, for example, a value indicating the directory. The directory name 42 is the virtual directory path name in the distributed file system 10. The directory update date 44 is information on the date on which the directory was updated last. The owner 46 is the owner name that is the creator of the directory. Only the owner and the system administrator (admin) may update the directory information.

The directory information includes a termination date 48 and a publication date 50 that specify the date before or after which the search of the directory information cannot be made. The termination date 48 is the effective search period termination date after which the search of this directory cannot be made. The publication date 50 is the effective search period start date before which the search of this directory cannot be made. The access right 52 includes an access control list.

Figure 9:
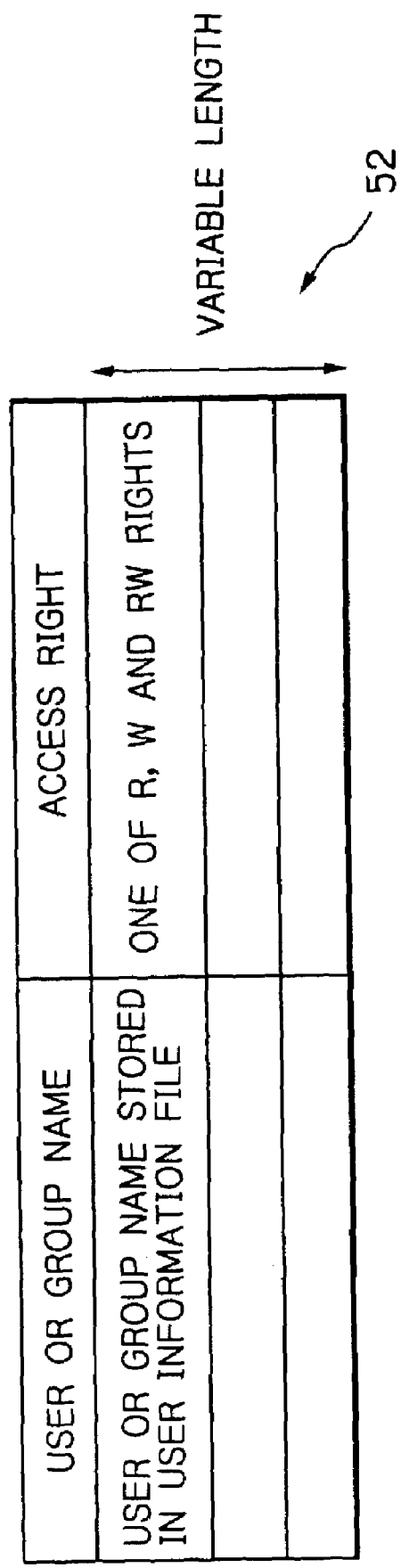
FIG. 9 shows an access control list that is one of items of the directory information shown in FIG. 8.

The access control list associates user names or group names with access rights as shown in FIG. 9. User names and group names are those stored in the user information file 1444 by the user information management functional unit 140. The access rights include a read (R) right, write (W) right, and read/write (RW) right. One of these three rights is made to correspond to a user name or a group name. The length of the access control list is variable. The access rights will be described later more in detail.

The file information includes a key 60, file name 62, file update date 64, owner 66, termination date 68, publication date 70, and file status 72 as shown in FIG. 10. The description of an item included in the file information that has the same name as that of an item included in the directory information is omitted here because its definition is the same. The file name 62 is a virtual file path name, and the owner 66 is the name of a user who stored the file. The file status 72 is an identifier indicating whether the file is an original file or a cached file, that is, a copied file.

FIGS. 11A and 11B show file sharing management when the host terminal 16 acquires or copies the file 184B by caching it from the host terminal 18. When the file is acquired, the directory information Q and the file 184B are added to the data storage area 164D of the host terminal 16 as shown in FIG. 11A. The file 184B includes the file information B and the file 184*b*. The cached information is shaded in the figure. Therefore, when the user uses the operation interface processing functional unit 162*a* to display the files managed by the file sharing management functional unit 160, the local view is displayed in which the file 164A is displayed below the directory "/P" and the file 184B is displayed below the directory "/Q". In the figures, the file 184B is shaded to indicate that the file is a cache i.e. copied file.

Next, the access rights to directory information will be described. For example, the R right to the directory P is the right to the directory P that is granted to the file sharing management functional unit of a host terminal. This right includes the following three rights: the first is the right to read out a file name directly below the directory P, the second is the right to search/acquire/read a file directly below the directory P, and the third is the right to read out a directory name directly below the directory P. The acquisition processing described above refers to the creation of the cache copy of a file that has been read out while the read processing refers to the read processing in which data is read out from a file.

The W right to the directory P is the right to the directory P that is granted to the file sharing management functional unit of a host terminal. This right includes the following four rights: the first is the right to create a new directory directly below the directory P, the second is the right to delete a directory directly below the directory P, the third is the right to add a new file directly below the directory P, and the fourth is the right to update/delete a file directly below the directory P. Note that a cache file cannot be updated.

The distributed file system 10 provides a system administrator with the account "admin" that has the RW right to all directories. The owner of a directory has the RW right to the directory the owner owns.

Figure 12:
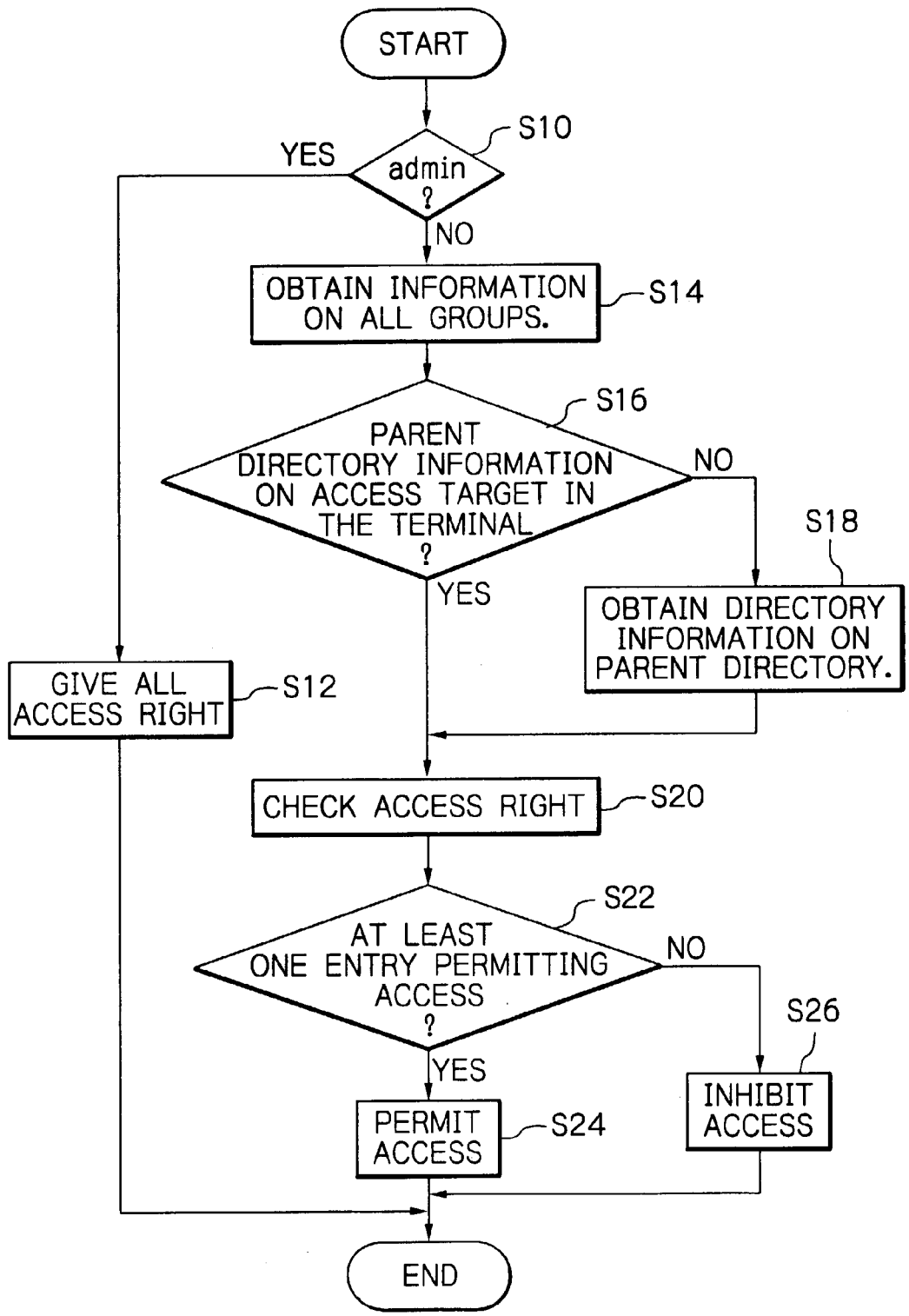
FIG. 12 is a flow chart useful for understanding an access right checking procedure in the distributed file system shown in FIG. 1.

Next, the access right checking procedure will be described. Before executing a directory or a file operation, an access right check is made as to if the user is allowed to access the directory or the file. First, the user is checked as to if he or she is a system administrator as shown in FIG. 12, step S10. This is done by checking whether or not the user ID is admin that is system administrator's account. If the user ID is admin that is the account of a system administrator (YES), the user is given the access right to all directories and files, step S12. The access right RW is given in this case. After this checking, control is passed to the end step.

If the user account is not admin that is the system administrator account (NO), information on all groups to which the user belongs in the distributed file system 10 is obtained, step S14. This group information may be obtained from the user information file 1444 by running the user information management functional unit 140 of the host terminal 14 when the user logs in the user's host terminal.

Then, a check is made if, on the host terminal on which the user is performing operation, there is the parent directory information on the directory or the file the user is going to access, step S16. If there is no parent directory information (NO), the host terminal on which the user is performing operation obtains parent directory information from the index information file 1244 via the file sharing index management functional unit 120 of the host terminal 12, step S18.

When the host terminal has the parent directory information or after the host terminal has obtained the parent directory information, it references the access control list included in the parent directory information to check the access rights, step S20.

Then, a check is made if the access rights obtained as a result of checking contain at least one entry that permits the host terminal to access the directory or the file, step S22. If there is such an entry (YES), the host terminal is permitted to access the directory or file in accordance with the permission (permitted), step S24. If there is not such an entry (NO), the host terminal is inhibited from accessing the directory or file, step S26. After the processing steps described above are executed, control is passed to the end.

Figure 13:
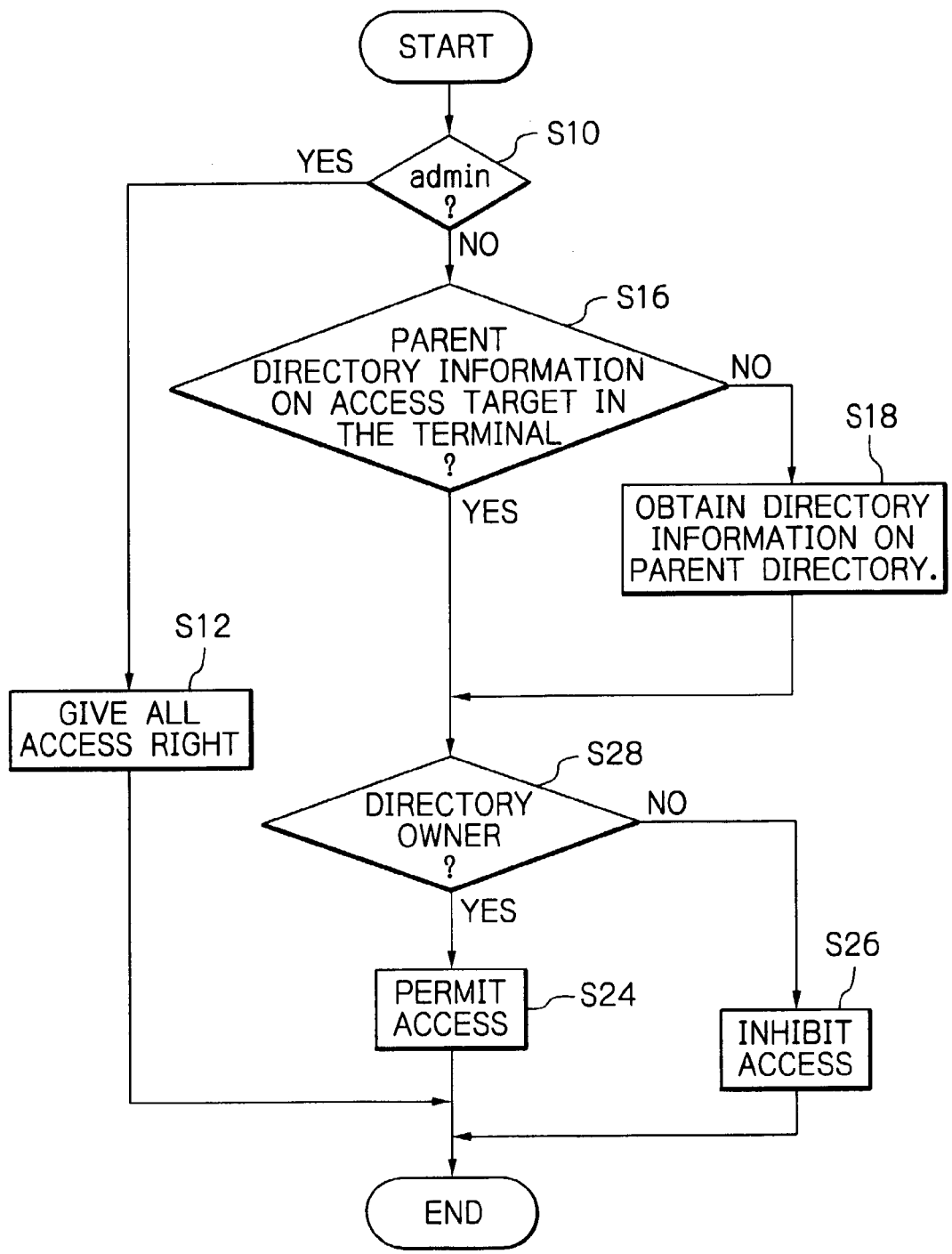
FIG. 13 is also a flowchart useful for understanding a user authentication procedure executed when directory information is updated in the distributed file system shown in FIG. 1.

In addition to the access right checking procedure described above, there is also an access right checking procedure for updating directory information such as the one shown in FIG. 13. In the figure, the same reference numeral the flowchart in FIG. 12 is used for a step in which the same processing as that in the access right checking procedure in FIG. 12 is executed to simplify the description. A check is made if the user is a system administrator, step S10, and, if so, all access rights are given and user authentication processing is finished. If the user is not a system administrator (NO), a check is made if the host terminal has parent directory information on the directory or file the user is going to access, step S16. If the host terminal has not the parent directory (NO), the file sharing index management functional unit 120 is executed to obtain the parent directory information from the index information file 1244.

Next, the directory information stored in the host terminal or the obtained directory information is referenced to check if the user is the owner of the directory, step S28. If the owner included in the directory information matches the user ID of the user as a result of comparison (YES), the user is permitted to update the directory information, step S24. If this comparison results in a mismatch (NO), the user is inhibited from updating the directory information, step S26. When the user requests to update directory information, the user is authenticated as described above to check if the user has the right to update the directory information and then the procedure is finished.

The following describes the sequence of operations on directories and files in the distributed file system 10 in which access right checking and user authentication are executed as described above. FIG. 14 shows the basic sequence of operations on directories and files. The basic sequence of operations is executed when a directory created, directory information is updated, or a directory is deleted.

For convenience of description, the host terminal 16 is used in the sequence shown in FIG. 14. At time T10, the user enters a request through the keyboard to send a directory operation instruction signal 200 to the operation interface processing functional unit 162a. In response to this signal, the operation interface processing functional unit 162a sends out an instruction request signal 202 to the file sharing management functional unit 160 at time T12.

At time T14, the file sharing management functional unit 160 starts checking the access right to the directory. When the file sharing management functional unit 160 finds that there is no directory information in the host terminal 16, it sends out an information acquisition request signal 204 to the file sharing index management functional unit 120 of the host terminal 12 at time T16 to acquire information on the parent directory. At time T18, the file sharing index management functional unit 120 starts searching for the requested parent directory information based on the index information file 1244 in which index information is integrally managed. At time T20, the file sharing index management functional unit 120 sends out an acquisition information signal 206 to the file sharing management functional unit 160 to send the parent directory information obtained by the search.

The file sharing management functional unit 160 checks the access right based on the parent directory information received at time T22. If the file sharing management functional unit 160 finds, as a result of checking, that the user has not the access right obtained from the directory information, it sends out a response signal 208 to the operation interface processing functional unit 162a at time T24 to indicate that the user has not the access right. After that, the operation interface processing functional unit 162a outputs a response signal 210 on the user's display 168 at time T26 to indicate that the user has not the access right. This signal notifies the user that the user has not the access right.

If it is found, during access right checking, that the parent directory information is stored in the data file 1644 managed by the file sharing management functional unit 160, the functional unit immediately checks the access right at time T16. If it is found that the user has not the access right, control is passed to the response processing executed at time T24 to execute the response processing at times T24 and T26 described above.

On the other hand, if it is found that the user has the access right as a result of access right checking, control is passed from the stage at time T16 or T22 to the stage at T28 where the request is processed. In this case, the file sharing management functional unit 160 performs processing according to the request indicated by the user and, at time T28, sends out an information notification signal 212 to the file sharing index management functional unit 120 to notify it of the processed directory information. If an operation request is sent at the same time from a plurality of host terminals to the file sharing index management functional unit 120 over the network 100, there is a possibility that an incompatible condition will be generated.

To prevent this incompatible condition from being generated, the file sharing index management functional unit 120 controls its connection to other terminals so that it can communicate with other terminals, one terminal at a time. In other words, the file sharing index management functional unit 120 is exclusively controlled in such a way that it can communicate only with the host terminal being connected. This exclusive control remains in effect for the period, from time T30 to time T32, during which the requested management processing is completed and the file sharing index management functional unit 120 sends out a response signal 214 to the file sharing management functional unit 160.

The file sharing management functional unit 160 outputs a response signal 216 to the operation interface processing functional unit 162a at time T34 to indicate that the requested processing has been completed. After that, the operation interface processing functional unit 162a sends out a response signal 218 to the display 168 at time T36. This signal notifies the user that the desired processing has been completed.

A more specific example will be described briefly. When the user at the host terminal 16 requests to create a directory in the distributed file system 10, the host terminal 16 receives the directory creation request via the operation interface processing functional unit 162a (time T12). The file sharing management functional unit 160 starts checking if the user has the W right that is one of access rights (time T14)

If it is found that the user has the W right, the file sharing management functional unit 160 creates directory information before time T28 arrives, based on the input data supplied from the keyboard 170 via the operation interface processing functional unit 162a. At time T28, the file sharing management functional unit 160 sends out the created directory information to the file sharing index management functional unit 120. From time T30 to T32, the file sharing index management functional unit 120 enters the exclusive control mode and adds the received directory information to the index information file 1244 as the management information to update the index information.

If it is found at time T16 or T22 that the user has not the W right, the file sharing management functional unit 160 goes to the processing at time T24 and executes the subsequent response processing.

When the user requests to update directory information, the host terminal 16 receives the directory information update request via the operation interface processing functional unit 162a. In response to this request, the file sharing management functional unit 160 authenticates the user to check if the user has the access right at time T16 or T22 depending upon whether or not the user owns the directory information. If it is found that the user is the owner of the directory or a system administrator, the host terminal 16 is given the access right to update the directory information.

Before time T28 arrives, the file sharing management functional unit 160 creates directory information for updating, based on data entered from the keyboard 170 via the operation interface processing functional unit 162a. At time T28, the file sharing management functional unit 160 sends out the created directory information to the file sharing index management functional unit 120. From time T30 to T32, the file sharing index management functional unit 120 enters the exclusive control mode, and adds the received directory information to the index information file 1244 as the management information to update the index information.

The file sharing index management functional unit 120, which knows which host terminal has a directory to be updated, sends out a notification about the updated directory information to the corresponding host terminal. This notification is called an event notification. The event notification is sent not only when a directory is updated but also when a directory is deleted, a file is updated, or a file is deleted. The procedure described below may be applied equally to directory deletion, file updating, and file deletion. Therefore, the procedure will be described briefly for the three types of processing given above with emphasis on the different points among them.

Assume that the host terminals 18 and 20 each have a directory corresponding to this event notification. In this case, the file sharing index management functional unit 120 sends out event notification signals 220 and 222 to the host terminals 18 and 20 at times T40 and T44, respectively, to send out the updated directory information as shown in FIG. 15. The file sharing management functional unit 180 receives the event notification at time T42 and updates the directory information in the data file 1844 before time T48 arrives. Similarly, a file sharing management functional unit 20a receives the event notification at time T46 and updates the directory information in the data file, not shown, before time T50 arrives.

The file sharing management functional unit 180 sends out an update notification signal 224 to the file sharing index management functional unit 120 at time T48 to notify it of the updated directory information. Similarly, the file sharing management functional unit 20a sends out an update notification signal 226 to the file sharing index management functional unit 120 at time T50 to notify it of the updated directory information. For example, the file sharing index management functional unit 120 enters the exclusive control mode for the period of time from T52 to T54 and updates the index information on the host terminals 18 and 20, which is included in the index information file 1244, based on the received update notification signals 224 and 226. The file sharing index management functional unit 120 outputs response signals 228 and 230 to the host terminal 18 and 20 at times T54 and T56, respectively. When the event notification is generated, the processing steps executed from time T40 to time T56 update the directory information as described above.

In the description above, the sequence of processing, that is, event notification, update processing, index information updating, and response transmission, is executed first for the host terminal 18 and then for the host terminal 20. As long as the sequence of procedure steps are executed for each host terminal in a predetermined order, the host terminals may be processed in any order.

When the user requests to delete directory information, the host terminal 16 receives the directory deletion request via the operation interface processing functional unit 162a (time T12). The file sharing management functional unit 160 starts checking if the user has the W right that is one of access rights (time T14). If it is found that the user has the W right, the file sharing management functional unit 160 deletes the directory information of a directory, which is either specified by the input data supplied from the keyboard 170 via the operation interface processing functional unit 162a or indicated by the position on the display 168 via the mouse 172, before the time T28 arrives.

The file sharing management functional unit 160 sends out the deleted directory information to the file sharing index management functional unit 120 at time T28. From time T30 to T32, the file sharing index management functional unit 120 enters the exclusive control mode and deletes the notified directory information, which is the information to be deleted, from the index information file 1244. The file sharing index management functional unit 120 also sends out an event notification to indicate that the directory has been deleted.

Basically, the sequence of operations on a file is also executed according to the sequence shown in FIG. 14. The file sharing management functional unit 160 executes file storing, search/acquisition (read), update, and deletion processing. When the user requests to store a file, the host terminal 16 receives the file storing request via the operation interface processing functional unit 162a. The file sharing management functional unit 160 checks if the user has the W right that is one of access rights. If it is found that the user has not the access right, the file sharing management functional unit 160 outputs the response signal 208 to the operation interface processing functional unit 162a at time T24 to indicate that the user has not the access right. If it is found that the user has the W right, the file sharing management functional unit 160 stores the file in the data file 1644. At the same time, the file sharing management functional unit 160 creates file information so that the stored file will be treated as a management entry. At time T28, the file sharing management functional unit 160 sends out the information notification signal 212 to the file sharing index management functional unit 120 to notify it of the created file information.

The file sharing index management functional unit 120 enters the exclusive control mode and adds the supplied file information to the index information file 1244 as a management entry to update the index information. After updating the index information, the file sharing index management functional unit 120 outputs the response signal 214 to the file sharing management functional unit 160 at time T32.

When the user requests to update a file, the host terminal 16 receives the file update request via the operation interface processing functional unit 162a. The file sharing management functional unit 160 checks if the user has the W right that is one of access rights. If it is found that the user has not the access right, the file sharing management functional unit 160 outputs the response signal 208 to the operation interface processing functional unit 162a at time T24 to indicate that the user has not the right.

If it is found that the user has the W right, the file sharing management functional unit 160 updates the file stored in the data file 1644. At this time, the file sharing management functional unit 160 creates file information reflecting the update in order to manage the updated file. Note that the file sharing management functional unit 160 may update only original files. The file sharing management functional unit 160 cannot update a cache file created as a copy of a file. As will be described later, a cache file may be updated by outputting an acquisition request to the corresponding host terminal in response to an event notification from the file sharing index management functional unit 120.

At time T28, the file sharing management functional unit 160 sends out the information notification signal 212 to the file sharing index management functional unit 120 to notify it of the created file information. The file sharing index management functional unit 120 enters the exclusive control mode and updates the index information in the index information file 1244 with the supplied file information as a management entry. After updating the index information, the file sharing index management functional unit 120 outputs the response signal 214 to the file sharing management functional unit 160 at time T32.

The file sharing index management functional unit 120 integrally manages which host terminal includes a cache file corresponding to an updated file. Based on this information, the file sharing index management functional unit 120 sends out an event notification to the host terminals 18 and 20, which have a cache file corresponding to the updated file, according to the sequence described above.

This event notification processing includes an extra sequence of steps not included in the sequence in FIG. 15. In this extra sequence, the file sharing management functional units 180 and 20a each output an acquisition request to the file sharing management functional unit 160 to acquire the updated file. In response to the acquisition request, the file sharing management functional unit 160 outputs the updated file information and updated file to the file sharing management functional units 180 and 20a. In response to the updated file information and updated file, the file sharing management functional units 180 and 20a update the cache file. The file sharing management functional units 180 and 20a send the update notification signals 224 and 226 to the file sharing index management functional unit 120, respectively, to notify it of the updated file information. The file sharing index management functional unit 120 enters the exclusive control mode and updates the index information in the index information file 1244 using the file information supplied from the file sharing management functional units 180 and 20a. After updating the index information, the file sharing index management functional unit 120 outputs the response signals 228 and 230 at times T54 and T56, respectively.

When the user requests to delete a file, the host terminal 16 receives the file deletion request via the operation interface processing functional unit 162a. The file sharing management functional unit 160 checks if the user has the W access right that is one of access rights. If it is found that the user has not the access right, the file sharing management functional unit 160 outputs the response signal 208 to the operation interface processing functional unit 162a at time T24 to indicate that the user has not the right. If it is found that the user has the W right, the file sharing management functional unit 160 deletes the file from the data file 1644. The file sharing management functional unit 160 sends out the information notification signal 212 to the file sharing index management functional unit 120 to indicate that the file has been deleted. When a cache file is deleted from the host terminal 16, the deletion processing is completed when this notification signal is sent.

On the other hand, when an original file of the host terminal 16 is deleted, the following processing is further executed. That is, the file sharing index management functional unit 120 enters the exclusive control mode and deletes the file information, which has been supplied from the file sharing management functional unit 160, from the index information file 1244. The file sharing index management functional unit 120, which integrally manages the terminals having a copied cache file of the deleted file, knows which host terminal has a copied cache file of the deleted file. Therefore, the file sharing index management functional unit 120 sends out an event notification to those terminals, as in the update processing described above, to cause the file sharing management functional units 180 and 20a to delete the file information and the file that have been deleted. In response to the notification from the file sharing management functional units 180 and 20a indicating that the file information has been deleted, the file sharing index management functional unit 120 deletes the corresponding file information of the host terminals 18 and 20 from the index information file 1244.

Finally, file search and acquisition (read) will be described with reference to FIG. 16. The host terminal 16 receives the operation instruction signal 200 via the operation interface processing functional unit 162a indicating that the user is going to search for a file (time T10). The operation interface processing functional unit 162a sends out the instruction request signal 202 to the file sharing management functional unit 160 to issue a file search request (time T12) The file sharing management functional unit 160 starts checking if the user has the R right that is one of access rights (time T14). The file sharing management functional unit 160 checks if the host terminal 16 has the directory information on the user.

If the file sharing management functional unit 160 finds that the host terminal 16 has not the directory information on the user, the file sharing management functional unit 160 outputs the information acquisition request signal 204 to the file sharing index management functional unit 120 (time T16) After time T18, the file sharing index management functional unit 120 searches the index information file 1244 for the user's access right list. From T18 to T20, the file sharing index management functional unit 120 obtains the corresponding directory information, which contains the access right list, from the index information file 1244. The obtained directory information is sent from the file sharing index management functional unit 120 to the file sharing management functional unit 160 as the acquisition information signal 206 (time T22)

If the file sharing management functional unit 160 has the directory information on the user, the file sharing management functional unit 160 checks at time T16 if the access right includes the R right. Therefore, the file sharing management functional unit 160 checks the directory information, which is supplied at time T16 or T22, if the access right includes the R right. If it is found that the access right does not include the R right, the file sharing management functional unit 160 sends out the response signal 208 to the operation interface processing functional unit 162a at time T24 to indicate that the user has not the right. In response to the response signal 208, the operation interface processing functional unit 162a outputs the response signal 210 to the display 168 at time T26.

If it is found that the access right includes the R right, the file sharing management functional unit 160 sends out the information notification signal 212 to the file sharing index management functional unit 120 to notify it of the search data supplied from the keyboard 170 via the operation interface processing functional unit 162a. From time T30 to T32, the file sharing index management functional unit 120 enters the exclusive control mode as described above and searches the file information stored in the index information file 1244 for the received search data. The file sharing index management functional unit 120 checks if there is file information that matches the search data and, in this example, finds that the desired file is in the host terminal 18.

At time T32, the file sharing index management functional unit 120 outputs the response signal 214 to the file sharing management functional unit 160 to send the search result. The file sharing management functional unit 160 outputs the response signal 216 to the operation interface processing functional unit 162a at time T34, and the operation interface processing functional unit 162a outputs the response signal 218 at time T36. In this way, the host terminal 16 in a virtually built distributed system can obtain the file search result quicker than before and display the result on the display 168.

For example, file acquisition processing is executed after file search processing as follows. In this case, the host terminal 16 receives a file acquisition instruction via the operation interface processing functional unit 162a at time T60. The operation interface processing functional unit 162a outputs the file acquisition request to the file sharing management functional unit 160 at time T62. Upon receiving this request at time T64, the file sharing management functional unit 160 outputs the information acquisition request signal 204 to the host terminal 18, which was found to have the file in the file search processing described above, to send the file acquisition request.

Before issuing the file acquisition request, the file sharing management functional unit 160 checks the file path, indicated by the file search result displayed as the local view, if the data file 1644 includes a new directory. If the file search result includes a directory that was not included in the local view, the file sharing management functional unit 160 also requests the file sharing management functional unit 180 to acquire directory information corresponding to the directory.

In response to the request received at time T68, the file sharing management functional unit 180 outputs, at time T70, the file acquisition information signal 206 to the file sharing management functional unit 160 to send the corresponding file information. If the file sharing management functional unit 160 has also issued a request to acquire the directory information described above, the file sharing management functional unit 180 sends out the acquisition information signal 206 including the directory information.

The file sharing management functional unit 160 caches the supplied information (time T72). At time T74, the file sharing management functional unit 160 sends out the information notification signal 212 to the file sharing index management functional unit 120 to inform it of the acquired information. Of course, if the directory information has also been acquired, this informational so includes the directory information. The file sharing index management functional unit 120 enters the exclusive control mode and updates the index information by adding the information, newly acquired for the host terminal 16, to the index information file 1244 from time T76 to time T78. The file sharing index management functional unit 120, file sharing management functional unit 160, and operation interface processing functional unit 162a output the response signals 214, 216, and 218 at times T78, T80, and T82, respectively.

Because file search processing is followed immediately by file acquisition processing in the description above, the access right is checked only once. If the processing is executed independently instead of being executed continuously, the access right must be checked once for each processing. When only the file read operation is executed in the distributed file system 10, the access right checking processing, access control processing, and exclusive control processing must also be executed as described above.

As described above, the system integrally manages files, which are treated virtually as distributed files in each case, based on the index information. As compared with a system in which file creation, updating, deletion, search, and acquisition are executed by checking the access right at each application level, this system greatly reduces the time required for processing.

The distributed file system 10, with the configuration described above, stores index information on the shared files in the file sharing index management functional unit 120 and, based on the index information, manages the files according to the access right. Therefore, even if one of the host terminals 16, 18, and so on, that is used by the user has not the desired directory information, the access right may be obtained from the file sharing index management functional unit 120 without having to access each host terminal. Local management of files by the file sharing management functional unit (160, 180, and so on) of the host terminal (16, 18 and so on) minimizes the access to the host terminal (16, 18, and soon) necessary before the completion of processing and, therefore, requires shorter processing time than before. This means that the distributed file system 10 is easy to use.

In addition, the file sharing index management functional unit 120 integrally manages the directory information owned by the host terminals for use in checking access rights. This configuration eliminates the need for accessing the file sharing index management functional unit 120 when the access right to a cached file is checked, thus increasing the efficiency of cache files stored in each host terminal and increasing distributed file processing efficiency.

In particular, when the access right is changed, the access right is updated for all host terminals in which the changed directory is cached. Therefore, the access rights in the system are kept consistent The entire disclosure of Japanese patent application No. 2001-362287 filed on Nov. 28, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A distributed file sharing system comprising:

a first host apparatus connected to a network,
a second host apparatus connected to the network, and
a third host apparatus connected to the network, wherein
    said first host apparatus has a first manager for managing first directory information including first access right information on a first directory,
    said second host apparatus has a second manager for managing second directory information including second access right information on a second directory, and managing the first directory information managed by said first host apparatus as fourth directory information,
    said third host apparatus has a third manager for managing directory information managed by said first host apparatus and directory information managed by said second host apparatus as index information,
    said first manager in said first host apparatus, further, has a first communicator for checking on the first directory information of access right information, updating the first directory information, and transmitting updated directory information to said third host apparatus as first update information,
    said third manager in said third host apparatus, further, has a second communicator for updating the directory information managed by said first host apparatus including the index information, based on the first update information, and transmitting updated directory information to said second host apparatus as second update information,
    said second manager in said second host apparatus, further, has a third communicator for updating the fourth directory information based on the second update information, and transmitting updated directory information to said third host apparatus as a third update information, and
    said third manager in said third host apparatus, further, updates the directory information managed by said second host apparatus including the index information, based on the third update information.

2. The system in accordance with claim 1, wherein the second access right information is of a format variable in length.

3. The system in accordance with claim 1, wherein the second access right information includes read right, write right, or a combination of read and write rights for stored user names and group names.

4. The system in accordance with claim 3, wherein the read right includes a permission of a reading of a file name or a directory name directly below the second directory, a search through the file, a creation of the file in a cache, and a reading of the file.

5. The system in accordance with claim 3, wherein the write right includes a permission of an addition of a file or a directory directly below the second directory, an update or deletion of the file, and a deletion of the second directory.

6. The system in accordance with claim 3, wherein the combination of read and write rights includes: a permission of a reading of a file name or a directory name directly below the second directory, a search through the file, a creation of the file in a cache and a reading of the file; an addition of a file or a directory directly below the second directory; an update or deletion of the file; and a deletion of the second directory.

7. A distributed file sharing system comprising:
a first host apparatus connected to a network,
a second host apparatus connected to the network, and
a third host apparatus connected to the network, wherein
    said first host apparatus has a first manager for managing first directory information including first access right information on a first directory, a first file stored in under the first directory and first file information in the first file,
    said second host apparatus has a second manager for managing second directory information including second access right information on a second directory, the second file information in the second file, and managing the first directory information, the first file and the first file information managed by said first host apparatus as a fourth directory a fourth file and fourth file information,
    said third host apparatus has a third manager for managing directory information and file information managed by said first host apparatus, and directory information and file information managed by said second host apparatus, as index information,
    said first manager in said first host apparatus further has a first communicator for checking on the first directory information of the access right information, updating the first directory information, the first file and the first file information, and transmitting updated directory information and updated file information to said third host apparatus as first update information,
    said third manager in said third host apparatus further has a second communicator for updating directory information and file information managed by said first host apparatus including the index information based on the first update information, and transmitting updated directory information to said second host apparatus as second update information,
    said second manager in said second host apparatus further, has a third communicator for updating the fourth directory information based on the second update information, updating the fourth file and the fourth file information based on the first file and the first file information in said first host apparatus, and transmitting updated directory information and file information to said third host apparatus as third update information, and
    said third manager in said third host apparatus further updates updated directory information and file information managed by said second host apparatus including the index information based on the third update information.

8. The system in accordance with claim 7, wherein said second manager in said second host apparatus manages the fourth directory information, the fourth file and the fourth file information using a cache.

9. A method for controlling access to file in a distributed file sharing system, comprising:
    a first management step of managing first directory information including first access right on a first directory in a first host apparatus connected to a network,
    a second management step of managing second directory information including second access right information on a second directory and the first directory information managed by said first host apparatus as a fourth directory in a second host apparatus connected to the network, and
    a third management step of managing a directory managed by the first host apparatus and a directory managed by the second host apparatus as index information in a third host apparatus connected to the network,
    said first management step further has a first communication step of checking on the first directory information of access right information, updating the first directory information, and transmitting updated directory information to said third host apparatus as a first update information, said third management step further has a second communication step of updating directory information managed by said first host apparatus for the index information based on the first update information, and transmitting updated directory information to said second host apparatus as second update information, said second management step further has a third communication step of updating the fourth directory information based on the second update information, transmitting updated directory information to said third host apparatus as third update information, and said third management step further updates directory information managed by said second host apparatus for the index information based on the third update information.

10. The method in accordance with claim 9, wherein the second access right information is of a format variable in length.

11. The method in accordance with claim 10, wherein the second access right includes read right, write right, or a combination of the read and write rights for stored user names and group names.

12. The method in accordance with claim 11, wherein the read right includes a permission of a reading of a file name or a directory name directly below the second directory, a search through the file, a creation of the file in a cache, and a reading of the file.

13. The method in accordance with claim 11, wherein the write right includes a permission of an addition of a file or a directory directly below the second directory, an update or deletion of the file, and a deletion of the second directory.

14. The method in accordance with claim 11, wherein the combination of read and write rights include:
   a permission of a reading of a file name or a directory name directly below the second directory, a search through the file, a creation of the file in a cache, a reading of the file;
   an addition of a file or a directory directly below the second directory;
   an update or deletion of the file; and
   a deletion of the second directory.

15. A method for controlling access to file in a distributed file sharing system, wherein the system comprising:
   a first management step of managing first directory information including first access right information on a first directory, a first file stored in under a first directory, and first file information in the first file in a first host apparatus connected to a network,
   a second management step of managing second directory information including second access right information on a second directory, a second file stored in under a second directory and a second file information in the second file, and the first directory information, the first file and the first file information managed by said first host apparatus as fourth directory information, a fourth file and fourth file information in a second host apparatus connected to the network, and
   a third management step of managing a directory and file information managed by the first host apparatus and a directory and file information managed by the second host apparatus as index information in a third host apparatus connected to the network,
   said first management step further has a first communication step of checking on the first directory information of access right information, updating the first directory information, the first file and the first file information, and transmitting updated directory information and updated file information to said third host apparatus as first update information,
   said third management step further has a second communication step of updating directory information and file information managed by said first host apparatus for the index information based on the first update information, and transmitting updated directory information to said second host apparatus as second update information,
   said second management step further has a third communication step of updating the fourth directory information based on the second update information, managing the fourth file and the fourth file information based on the first file and the first file information including said first host apparatus, and transmitting updated directory information and updated file information to said third host apparatus as third update information, and
   said third management step further updates directory information and file information managed by said second host apparatus for the index information based on the third update information.

16. The method in accordance with claim 15, wherein said second management step manages the fourth directory information, the fourth file and the fourth file information using a cache.

* * * * *